Patented Oct. 20, 1931

1,827,822

UNITED STATES PATENT OFFICE

CHARLES R. McKEE, OF MILWAUKEE, WISCONSIN, ASSIGNOR TO AMERICAN HAIR & FELT COMPANY, OF CHICAGO, ILLINOIS, A CORPORATION OF DELAWARE

COATING

No Drawing. Application filed November 26, 1928. Serial No. 322,091.

The invention relates to a new coating or sizing.

The object of the invention is to provide a new composition of matter forming a coating or sizing for the purpose of rendering the material coated therewith impervious to the usual cements or adhesives used in securing this material to other materials and also having desirable properties for use as a size in connection with the manufacture of cloth products, felt products and certain kinds of paper.

The invention further consists in a new composition of matter hereinafter more particularly described and claimed.

Broadly stated, the sizing embodying the invention consists of a viscous adhesive coating and a small amount of an emulsified oil.

As an example of the sizing embodying the invention, the following formula is given: Water 85 parts, ground glue 5 parts, starch 5 parts, "Sulphite extract" 3 parts and sulphonated oil 2 parts.

The glue, starch and sulphite extract ingredients, with the water, forms a watery, colloidal mass constituting a viscous adhesive coating composition to which is added a small amount of an emulsified oil, to-wit: about two per cent. by weight of the whole mass, which has a colloidal effect on the whole composition.

The glue is preferably an animal glue prepared from bones or hide material. Stated in another way, I use equal parts of ground glue and starch, sulphite extract to the amount of about thirty per cent. of said ingredients, and water, which ingredients are colloidally combined with a small amount of an emulsified oil, preferably a sulphonated oil.

If necessary to prevent the possibility of souring, the coating may have a preservative added thereto, such as Beta-naphthol dissolved in a suitable solvent, such as denatured alcohol, in proportions of one part Beta-naphthol to four parts of denatured alcohol in eight hundred parts of the above mixture. Alpha-naphthylamine may be similarly dissolved in denatured alcohol and mixed in eight hundred parts of the mixture. The preservatives above described also have the effect of moth-proofing material on which the mixture is used, as the action of sublimation causes gases to be given off which repel insects, such as moths, and these gases persist in the fabric or other material with which the sizing is used for long periods of time. The preservatives also prevent any possibility of the starch souring.

The starch may be either a tapioca starch, such as cassava or sago, or corn or potato starch. The cassava or sago starches are preferred as they reduce the period of boiling in the preparation of the mixture.

The "sulphite extract", as is well known, is a product obtained from the waste sulphite liquor in the manufacture of paper and of the three parts of sulphite extract I prefer to use the bleached form of said extract as one part, for the purpose of improving the color of the coating. This sulphite extract has adhesive properties as well as coloring properties.

Sulphonated oils suitable for use may be such oils as sulphonated castor oil, commonly known as "turkey red oil", or sulphonated corn oil, or sulphonated animal or mineral oils, for example, a product formerly known as genasco oil. Such oils have emulsifying properties which form an oily film on the surface of the coating which will retard the penetration of moisture or any adhesive which may be subsequently applied to said coating and yet allow the coating itself to adhere to the material to which it is applied.

The ingredients noted above are soaked in the water, which is initially cold, and then the mixture is boiled, to break up the starch granules, at any suitable boiling temperature, for example, two hundred twelve degrees Fahrenheit.

The mixture so prepared may be incorporated with the material in connection with which it is to be used in any suitable manner, for example by spraying it on the material or by putting it on with a brush, the particular method of application depending upon the type of material being treated. Spraying is preferably done by devices using compressed air and of constructions well known in the art so it is not deemed necessary to illustrate the same. The brushing is done with a brush such as used in spreading paint and of a length or size suitable for the material.

The coating above described has the desirable characteristic of being impervious to ordinary adhesives, such as dextrine cement. It is also elastic and hence material on which it is used may be readily manipulated without danger of cracking the coating. The sizing itself forms a film or thin layer on the material and in and of itself has no particular penetrating qualities so that the natural characteristics of the material being covered by the coating may be maintained. The coating also has adhesive properties, making it desirable for use as a coating between the coated material and a suitable cement or adhesive.

The proportions of material stated above are given by way of an example and may, of course, be varied to some extent without departing from my invention.

What I claim as my invention is:

1. A new coating composition or sizing comprising a watery, viscous adhesive coating composed of ground glue, starch and sulphite extract and a small amount of a sulphonated oil.

2. A new sizing, comprising ground glue, five parts; starch, five parts; sulphite extract, three parts; sulphonated oil, two parts; mixed with substantially eighty-five parts of water.

3. A sizing comprising water about eighty-five parts, ground glue about five parts, starch about five parts, sulphite extract three parts, and turkey red oil two parts.

4. A new coating composition or sizing comprising a watery, viscous adhesive coating composed of ground glue, starch and sulphite extract and about two per cent. by weight of a sulphonated oil.

In testimony whereof, I affix my signature.

CHARLES R. McKEE.